United States Patent [19]

Stackman et al.

[11] 4,191,681

[45] Mar. 4, 1980

[54] MELT PROCESSABLE WHOLLY AROMATIC POLYESTER COMPOSITION CONTAINING A PHOSPHORUS ESTER

[75] Inventors: Robert W. Stackman, Morristown; Edward J. Kuczynski, Westfield, both of N.J.

[73] Assignee: Celanese Corporation, New York, N.Y.

[21] Appl. No.: 852,384

[22] Filed: Nov. 17, 1977

[51] Int. Cl.$^2$ .................. C08L 67/02; C08L 67/04
[52] U.S. Cl. .................. 260/45.7 P; 525/434; 528/125; 528/126; 528/128; 528/167; 528/169; 528/173; 528/190; 528/193; 528/194; 528/487
[58] Field of Search .................. 260/47 C, 49, 47 P, 260/860, 45.7 P; 528/167, 169, 125, 126, 128, 173, 177, 193, 194, 190, 487

[56] References Cited

U.S. PATENT DOCUMENTS

| | | | |
|---|---|---|---|
| 3,520,849 | 7/1970 | Vandenberg | 260/47 |
| 3,998,789 | 12/1976 | Yoshioka | 260/47 P |
| 4,035,442 | 7/1977 | Dunworth | 260/860 |

OTHER PUBLICATIONS

C.A. vol. 81, No. 20, Nov. 18, 1974, Sakata Hiroshi et al., "Polyester Compositions With Improved Workability", p. 65, abstract #121910c.
C.A. vol. 81, Dec. 2, 1974, Hiroshi et al., "Polyester Compositions With Improved Workabiity", p. 35, abstract #137062p.
C.A., vol. 85, No. 4, Jul. 26, 1976, Kenichi et al., "Polyester Compositions With Good Moldability", p. 44, abstract #22407v.

*Primary Examiner*—Lester L. Lee
*Attorney, Agent, or Firm*—Kenneth A. Genoni

[57] ABSTRACT

The present invention provides a melt processable composition and process for preparing the same from a blend of a normally non-melt processable wholly aromatic polyester and a phosphorus ester. The presence of the specifically defined phosphorus ester in the composition in amounts of up to about 40 percent by weight renders the normally non-melt processable wholly aromatic polyester melt processable.

54 Claims, No Drawings

MELT PROCESSABLE WHOLLY AROMATIC POLYESTER COMPOSITION CONTAINING A PHOSPHORUS ESTER

BACKGROUND OF THE INVENTION

Wholly aromatic polyester resins long have been known. For instance, p-hydroxybenzoic acid homopolymer and copolymers have been provided in the past and are commercially available. Those wholly aromatic polyesters normally encountered in the prior art have tended to be somewhat intractable in nature and to present substantial difficulties if one attempts to melt process the same while employing conventional melt processing procedures. Such polymers commonly are crystalline in nature, relatively high melting or possess a decomposition temperature which is below the melting point. Molding techniques such as compression molding or sintering may be utilized with such materials; however, injection molding, melt spinning, etc., commonly have not been viable alternatives or, when attempted, commonly have been accomplished with difficulty. Such polymers commonly cannot be melt extruded to form nondegraded fibers. Even those wholly aromatic polymers which exhibit a melting point below their decomposition temperature commonly melt at such high temperatures or have such extremely high melt viscosities that employment of these polymers in molding or extrusion processes to obtain a quality product is a complicated matter and in some instances almost impossible. For instance, fibers melt extruded at extremely high temperatures commonly possess a voidy internal structure and diminished tensile properties.

Representative publications which discuss wholly aromatic polyesters include: (a) *Polyesters of Hydroxybenzoic Acids,* by Russell Gilkey and John R. Caldwell, J. of Applied Polymer Sci., Vol. II, Pages 198 to 202 (1959), (b) *Polyarylates (Polyesters From Aromatic Dicarboxylic Acids and Bisphenols),* by G. Bier, Polymer, Vol. 15, Pages 517 to 535 (August 1974), (c) *Aromatic Polyester Plastics,* by S. G. Cottis, Modern Plastics, Pages 62 to 63 (July 1975) and (d) *Poly(p-Oxybenzoyl Systems): Homopolymer for Coatings; Copolymers for Compression and Injection Molding,* by Roger S. Storm and Steve G. Cottis, Coatings Plast. Preprint, Vol. 34, No. 1, Pages 194 to 197 (April 1974). See also U.S. Pat. Nos. 3,039,994; 3,169,121; 3,321,437; 3,553,167; 3,637,595; 3,651,014; 3,723,388; 3,759,870; 3,767,621; 3,787,370; 3,790,528; 3,829,406; 3,890,256; and 3,975,487.

Prior attempts to obtain a melt processability from a wholly aromatic polyester have centered upon synthesizing a polyester from certain specifically defined monomer units which when incorporated into a single polymer in certain molar proportions yield a polyester capable of being melt processed. Illustrations of such polymers may be found in U.S. Patent Application Ser. No. 686,189, filed May 13, 1976, by Gordon W. Calundann, entitled "Improved Melt Processable Thermotropic Wholly Aromatic Polyester and Process for Its Production", and U.S. Patent Application Ser. No. 789,374, filed Apr. 20, 1977, by Gordon W. Calundann, Herbert L. Davis, Frederick J. Gorman, and Robert M. Mininni, entitled "Improved Melt Processable Thermotropic Wholly Aromatic Polyester Which Is Particularly Suited for Fiber Formation," both of which are herein incorporated by reference.

The polyesters described in both of these applications exclude a terephthalic acid moiety since such would destroy the melt processability of the polyester.

The exclusion of the terephthalic acid moiety from the aromatic polyester, however, may hinder the optimization of certain properties, such as tensile strength, impact strength, thermal stability, stability over long-term high temperature use, and modulus, which the terephthalic acid moiety helps to achieve.

In some instances it is possible to achieve melt processability of a wholly aromatic polyester, such as polyresorcinol phthalate which employs terephthalic acid, by utilizing specific molar ratios of isophthalic and terephthalic acid as illustrated by U.S. Patent Application Ser. No. 822,579, filed Aug. 8, 1977, by Charles E. Kramer, entitled "Melt Polymerization Process for Preparing Melt Processable Resorcinol Phthalate Polyester Utilizing a Metal Acetate Catalyst," herein incorporated by reference. The terephthalic acid content of the polyester prepared in accordance with this process, however, is held to a minimum (i.e., not greater than 30%) and consequently the optimization of physical properties as described above, such as tensile strength, impact strength and modulus, which results when terephthalic acid is present in said polyester at higher molar ratios is difficult to achieve.

It has been observed that certain phosphorus esters may be utilized as flame retardants as illustrated by U.S. Pat. Nos. 3,761,543 and 3,027,349.

It is an object of the present invention to provide a melt processable wholly aromatic polyester containing composition utilizing a normally non-melt processable wholly aromatic polyester.

It is a further object of the present invention to provide a process for rendering certain normally non-melt processable aromatic polyesters capable of being melt processed without deleteriously affecting the integrity of the polymer.

It is a still further object of the present invention to provide a wholly aromatic polyester containing composition, having a reduced melt viscosity for improved processability.

These and other objects as well as the scope, nature and utilization of the invention will be apprent to those skilled in the art from the following description and appended claims.

SUMMARY OF THE INVENTION

In one aspect of the present invention, there is provided an improved melt processable wholly aromatic polyester composition which comprises in intimate admixture:

I. from about 95 to about 60 percent by weight of said composition of a normally non-melt processable wholly aromatic polyester having a recurring structural formula:

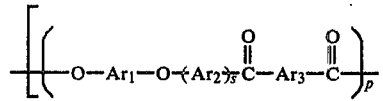

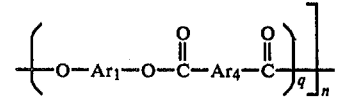

wherein n is an integer of at least 10, Ar₁ is a divalent moiety selected from the group consisting of

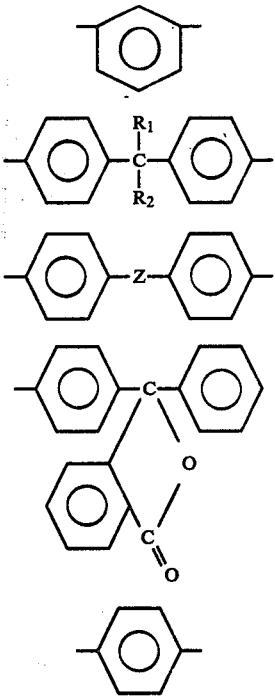

and mixtures thereof, wherein R₁ and R₂ which may be the same or different represent hydrogen, a lower alkyl group or together constitute a cyclic hydrocarbon group and Z is selected from the group consisting of sulfide, sulfone, oxy and carbonyl;

Ar₂ is the p-hydroxy benzoic acid derived moiety

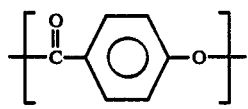

which when present is accompanied by substantially equimolar amounts of the divalent moiety Ar₁ and the acid derived moiety as represented by Ar₃ and Ar₄ collectively;

Ar₃ consists essentially of an aromatic dicarboxylic acid-derived moiety selected from the group consisting of m-phenylene, p-phenylene and naphthylene and mixtures thereof;

Ar₄ is p-phenylene; and wherein s is 0 or 1, p is at least 1, q is zero when Ar₃ is other than naphthylene and q is at least 1 when Ar₃ is naphthylene with the ratio of p and q being sufficient to yield a normally non-melt processable wholly aromatic polyester;

and (II) from about 5 to about 40 percent by weight of the total composition of a phosphorus ester having the recurring structural formula:

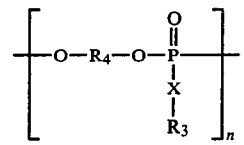

wherein n is at least 3, X can be the same or different and represent a single bond, oxy and sulfide, R₃ can be the same or different and represent lower alkyl, aryl, haloaryl, halo alkyl, and mixtures thereof; R₄ can be the same or different and represent arylene, alkylene and haloarylene and mixtures thereof.

In another aspect of the present invention, there is provided a process for preparing a melt processable wholly aromatic polyester composition which comprises blending in intimate admixture:

(I) from about 95 to about 60 percent by weight of said composition of a normally non-melt processable wholly aromatic polyester of the recurring structural formula:

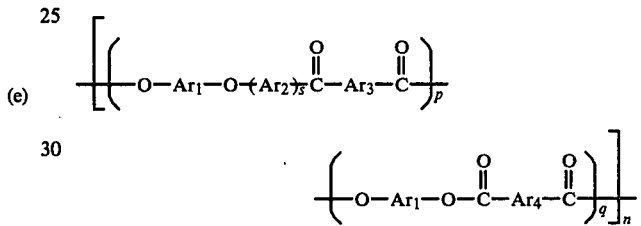

wherein n is an integer of at least 10, Ar₁ is a divalent moiety selected from the group consisting of

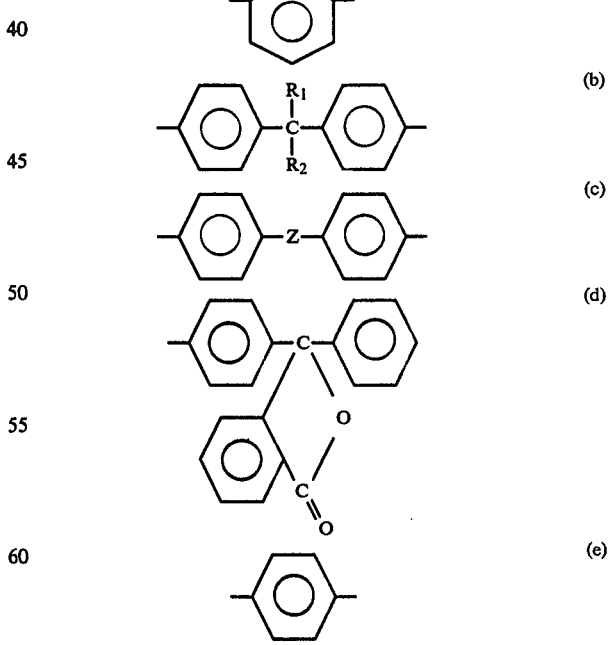

and mixtures thereof, wherein R₁ and R₂ which may be the same or different represent hydrogen, a lower alkyl group or together constitute a cyclic hydrocarbon group and Z is selected from the group consisting of sulfide, sulfone, oxy and carbonyl;

Ar$_2$ is the p-hydroxy benzoic acid derived moiety

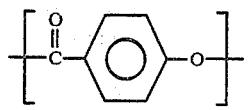

which when present is accompanied by substantially equimolar amounts of the divalent moiety Ar$_1$ and the acid derived moiety as represented by Ar$_3$ and Ar$_4$ collectively;

Ar$_3$ consists essentially of an aromatic dicarboxylic acid-derived moiety selected from the group consisting of m-phenylene, p-phenylene and naphthylene and mixtures thereof;

Ar$_4$ is p-phenylene; and wherein s is 0 or 1, p is at least 1, q is zero when Ar$_3$ is other than naphthylene and q is at least 1 when Ar$_3$ is naphthylene with the ratio of p and q being sufficient to yield a normally non-melt processable wholly aromatic polyester;

with (II) from about 5 to about 40 percent by weight of the total composition of a phosphorus ester having the recurring structural formula:

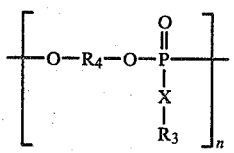

wherein n is at least 3, X can be the same or different and represent a single bond, oxy and sulfide, R$_3$ can be the same or different, and represent lower alkyl, aryl, haloaryl, haloalkyl, and mixtures thereof; R$_4$ can be the same or different and represent arylene, alkylene and haloarylene and mixtures thereof to yield a composition which is melt processable at a temperature of from about 200° to about 350° C. and at a pressure of from about 30 to about 40,000 psi.

DESCRIPTION OF THE PREFERRED EMBODIMENTS

The melt processable composition of the present invention comprises a physical blend of a normally non-melt processable wholly aromatic polyester in intimate admixture with a phosphorus ester.

The wholly aromatic non-melt processable polyester of the present invention comprises a variety of recurring moieties which when combined in a polyester have have found to be incapable of being melt processed in accordance with typical melt processing procedures.

A melt processable polymer in the context of the present invention is one which can be extruded at temperatures of about 200° to about 350° C. (e.g., 250° to about 320° C.) at a pressure of about 30 to about 40,000 psi.

The presence or absence of melt processability of the abovementioned polyesters as described above often depends on the molar amounts of terephthalic acid moiety present therein. Nevertheless, while certain polyesters can tolerate minor amounts of terephthalic acid (e.g., polyresorcinol phthalate) certain other polyesters such as the polymerization reaction product of 3,3 bis(p-hydroxyphenyl) phthalide (i.e., phenolphthalein) and isophthalic acid are non-melt processable even in the absence of terephthalic acid.

Consequently, the following discussion is intended to identify the non-melt processable aromatic polyesters which can be rendered melt processable in accordance with the present invention and to further identify the specific molar ratios of the acid derivatives where pertinent to defining non-melt processability.

Those wholly aromatic polyesters which are inherently melt processable are obviously outside the scope of the present invention.

Thus, the normally non-melt processable aromatic polyesters which can be utilized in accordance with the present invention are illustrated by the recurring structural formula:

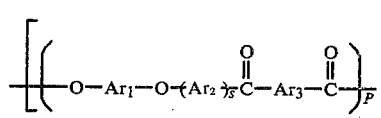

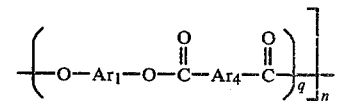

wherein n is an integer of at least 10, Ar$_1$ is a divalent, preferably alcohol derived, moiety selected from the group consisting of:

(a) 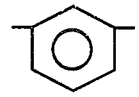

(b) 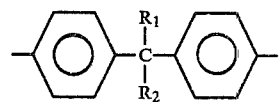

(c) 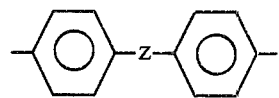

(d) 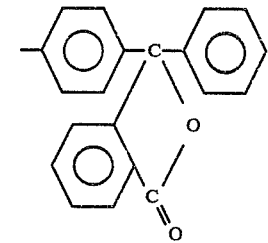

(e) 

and mixtures thereof, wherein R$_1$ and R$_2$ which may be the same or different represent hydrogen, a lower alkyl group or together constitute a cyclic hydrocarbon group and Z is selected from the group consisting of sulfide, sulfone, oxy and carbonyl.

Ar$_2$ is the p-hydroxy benzoic acid derived moiety

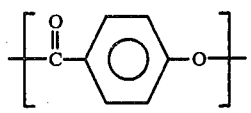

which when present is accompanied by substantially equimolar amounts of the alcohol derived moiety $Ar_1$ and the acid derived moiety as represented by $Ar_3$ and $Ar_4$ collectively.

$Ar_3$ consists essentially of an aromatic dicarboxylic acid-derived moiety selected from the group consisting of m-phenylene, p-phenylene and naphthylene and mixtures thereof.

$Ar_4$ is p-phenylene, and s is 0 or 1, p is at least 1, q is 0 when $Ar_3$ is other than naphthylene and q is at least 1 when $Ar_3$ is naphthylene with the ratio of p and q being sufficient to yield a normally non-melt processable wholly aromatic polyester.

For ease of discussion, the polyesters which fall within the structural formula illustrated above can be characterized as falling within several groups.

The first, and most preferred, group, comprises those polyesters of recurring structural formula I wherein $Ar_1$ is a single moiety, as opposed to a mixture of moieties, selected from the group illustrated by formulas (a) through (e) and $Ar_2$ is a phthalic acid derived moiety comprising m-phenylene or a mixture of m-phenylene and p-phenylene. For such polyesters q is 0 and $Ar_2$ does not include naphthylene. The polyesters of this group can be summarized by the recurring structural formula:

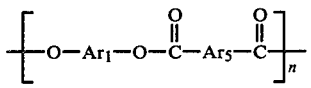
II.

wherein $Ar_1$ and n are as described above and $Ar_5$ is a phthalic acid derived moiety selected from the group consisting of m-phenylene, p-phenylene, and mixtures thereof.

The specific molar ratios of the phthalic acid derived moiety of $Ar_5$ which yield a non-melt processable polyester will depend on the identity of $Ar_1$.

Thus, when $Ar_1$ of the polyester of the recurring structural formula is m-phenylene (which may be derived from resorcinol) as illustrated by formula (a) the phthalic acid derived moiety of $Ar_5$ can constitute from about 100 to about 70 mole percent, preferably from about 95 to about 75 mole percent p-phenylene (e.g., 80 mole percent) and correspondingly from about 0 to about 30 mole percent, preferably from about 5 to about 25 mole percent m-phenylene (e.g., 20 mole percent).

When $Ar_1$ is the alkylidene bis-phenylene illustrated by formula (b) the phthalic acid derived moiety $Ar_5$ can constitute from about 80 to about 20 mole percent, preferably from about 75 to about 50 mole percent (e.g., 70 mole percent) p-phenylene and correspondingly from about 20 to about 80 mole percent, preferably from about 25 to about 50 mole percent (e.g., 30 mole percent) m-phenylene.

When $Ar_1$ is bis-phenylene illustrated by formula (c) wherein Z is oxy the phthalic acid derived moiety of $Ar_5$ can constitute from about 100 to about 60 mole percent, preferably from about 95 to about 65 mole percent (e.g., 75 mole percent) p-phenylene and correspondingly from about 0 to about 40 mole percent, preferably from about 5 to about 35 mole percent (e.g., 25 mole percent) m-phenylene.

When $Ar_1$ is the bis-phenylene illustrated by formula (c) wherein Z is sulfide, the phthalic acid derived moiety of $Ar_5$ can constitute from about 100 to about 50 mole percent, preferably from about 95 to about 60 mole percent (e.g., 75 mole percent) p-phenylene and correspondingly from about 0 to about 50 mole percent, preferably from about 5 to about 40 mole percent (e.g., 25 mole percent) m-phenylene.

When $Ar_1$ is the bis-phenylene illustrated by formula (c) wherein Z is sulfone the phthalic acid derived moiety of $Ar_5$ can constitute from about 100 to about 50 mole percent, preferably from about 95 to about 55 mole percent (e.g., 75 mole percent) p-phenylene and correspondingly from about 0 to about 50 mole percent, preferably from about 5 to about 45 mole percent (e.g., 25 mole percent) m-phenylene.

When $Ar_1$ is the bis-phenylene illustrated by formula (c) wherein Z is carbonyl the phthalic acid derived moiety $Ar_5$ can constitute from about 100 to about 45 mole percent, preferably from about 95 to about 50 mole percent (e.g., 60 mole percent) p-phenylene and correspondingly from about 0 to about 55 mole percent, preferably from about 5 to about 50 mole percent (e.g. 40 mole percent) m-phenylene.

When $Ar_1$ is the bis(p-phenylene) phthalide illustrated by formula (d), namely, a phenolphthalein derived moiety the phthalic acid derived moiety $Ar_5$ can constitute from about 100 to about 40 mole percent, preferably from about 90 to about 50 mole percent (e.g. 55 mole percent) p-phenylene and correspondingly from about 0 to about 60 mole percent, preferably from about 10 to about 50 mole percent (e.g., 45 mole percent) m-phenylene.

When $Ar_1$ is the p-phenylene illustrated by formula (e), (which can be drived from hydroquinone) the phthalic acid derived moiety $Ar_5$ can constitute from about 100 to about 40 mole percent, preferably from about 85 to about 50 mole percent, (e.g. 80 mole percent) p-phenylene and correspondingly from about 0 to about 60 mole percent, preferably from about 15 to about 50 mole percent (e.g., 20 mole percent) m-phenylene.

The second group of normally non-melt processable wholly aromatic polyesters comprises those polyesters of the recurring structural formula I wherein $Ar_1$ may be a mixture of two or more of the moities illustrated by formulas (a) through (e) and $Ar_5$ is as described above.

It is not deemed necessary to provide a specific phthalic acid isomer ratio for each possible combination of the moities included within the scope of $Ar_1$ sufficient to yield a non-melt processable polyester since such ratios may be easily determined by one skilled in the art.

A representative example of the second group of normally non-melt processable wholly aromatic polyesters wherein $Ar_1$ of recurring structural formula I is a mixture of isomers may be illustrated by the recurring structural formula

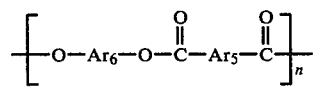
III.

wherein n is at least 10, $Ar_6$ is a mixture of the divalent moieties comprising

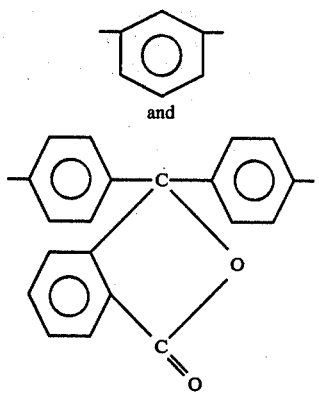

(i)

and (ii)

and $Ar_5$ is a phthalic acid derived moiety selected from the group consisting of m-phenylene, p-phenylene and mixtures thereof.

The accompanying phthalic acid derived moieties illustrated by $Ar_5$ can constitute from about 90 to about 25 mole percent, preferably from about 75 to about 35 mole percent (e.g., 50 mole percent) p-phenylene and correspondingly from about 10 to about 75 mole percent, preferably from about 25 to about 65 mole percent (e.g. 50 percent) m-phenylene.

A preferred polyester of the second group is illustrated by recurring structural formula III wherein the component moieties of $Ar_6$ namely, the m-phenylene illustrated by formula (i) and the bis(p-phenylene) phthalide illustrated by formula (ii) are present in said polyester at a molar ratio of about 1:1 and wherein $Ar_5$ constitutes a mixture of about 60 mole percent m-phenylene and correspondingly about 40 mole percent p-phenylene.

It is further contemplated that the wholly aromatic polyester of formula I may also include the p-hydroxy benzoic acid derived moiety

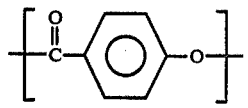

represented by $Ar_2$. This moiety when present will comprise about 10 to about 70 mole percent, preferably from about 25 to about 60 mole percent (e.g., 50 mole percent) of the wholly aromatic polyester and is accompanied by the presence of equimolar amounts of the divalent, preferably alcohol derived, moiety of $Ar_1$ and the divalent dicarboxylic acid derived moiety illustrated by $Ar_3$ and $Ar_4$ collectively.

Preferred divalent $Ar_2$ moieties utilized in combination with $Ar_2$ include those derived from resorcinol, hydroquinone, 2,2-bis(4-hydroxyphenyl) propane (i.e., Bisphenol A), bis(4-hydroxy phenyl)sulfone, and 4,4'-oxydiphenol.

Preferred divalent moieties illustrated by $Ar_3$ and $Ar_4$ collectively used in combination with $Ar_2$ include those derived from isophthalic and terephthalic acid.

The third group of normally non-melt processable wholly aromatic polyesters which are included within the recurring structural formula I include those polyesters wherein the dicarboxylic acid derived moiety $Ar_3$ can be naphthylene. As may be seen from recurring structural formula I when the naphthylene moiety is present it is always accompanied by the presence of p-phenylene (i.e., $Ar_4$) and optionally by the presence of m-phenylene (i.e., when $Ar_3$ is a mixture of moieties which includes m-phenylene).

The ratio of p to q is so chosen as to provide a non-melt processable wholly aromatic polyester and can easily be determined by one skilled in the art.

Typical molar ratios of p:q, respectively, can vary from about 1:50 to about 1:1 preferably from about 1:25 to about 1:2 (e.g., 1:5).

Other ester-forming moieties (e.g., dicarboxy or dioxy units) other than those previously discussed additionally may be included in the wholly aromatic polyester of the present invention in a minor concentration (e.g., up to about 10 mole percent) so long as such moieties do not adversely influence the ultimate result of melt processability. As will be apparent to those skilled in the art, the total molar quantities of dicarboxylic acid derived moieties and the dihydroxy derived moieties present within the wholly aromatic polyester will be substantially equal. The various moieties upon polymer formation will tend to be present in a random configuration.

The wholly aromatic polyesters of the present invention commonly exhibit

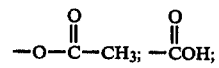

or -OH end groups depending upon the synthesis route selected. As will be apparent to those skilled in the art, the end groups optionally may be capped, e.g., acidic end groups may be capped with a variety of alcohols, and hydroxyl end groups may be capped with a variety of organic acids. For instance, end capping units such as phenylester

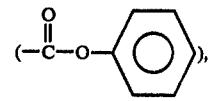

and methylester

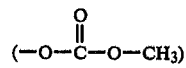

optionally may be included at the end of the polymer chains. The polymer also may be oxidatively cross-linked to at least some degree, if desired, by heating in an oxygen-containing atmosphere (e.g. in air) while in bulk form or as a previously shaped article at a temperature below its melting point for a limited period of time (e.g., for a few minutes).

The wholly aromatic polyesters which may be utilized in accordance with the present invention commonly exhibit a weight average molecular weight of about 2000 to about 500,000 and preferably of about 10,000 to about 300,000 (e.g., about 50,000 to about 200,000). Such molecular weight may be conveniently determined by standard techniques not involving the solutioning of the polymer (e.g., by end group determination via infra red spectroscopy on compression molded films), or by the testing of a solution of the polymer in a suitable solvent such as pentafluorophenol via light scattering techniques, vapor phase osmometry, membrance osmometry, etc.

The molecular weights generally correspond to n values of about 10 to about 2000, preferably from about 40 to about 1250 (e.g., 200 to about 800).

The wholly aromatic polyesters of the present invention may be formed by a variety of ester-forming techniques whereby organic monomer compounds possessing functional groups which upon condensation form the requisite recurring moieties are reacted. For instance, the functional groups of the organic monomer compounds may be carboxylic acid groups, hydroxyl groups, ester groups, acid halides, etc. For instance, the organic monomer compounds may be reacted in the absence of a heat exchange fluid. They, accordingly, may be heated initially via a solid phase condensation procedure to form dimers, trimers, etc., with the temperature being progressively raised until it exceeds the oligomer melting point and with the reaction continuing via a melt condensation procedure, as discussed in the Kramer application described above. A vacuum may be applied to facilitate removal of volatiles formed during the condensation (e.g., acetic acid and water). Also, a slurry polymerization process may be utilized as illustrated by the Calundann et al application described above which is herein incorporated by reference. Alternatively, the aromatic diols and aromatic carboxylic acid chloride may be mixed in a suitable solvent such as methylene chloride in a typical solution polymerization procedure utilizing any of the well-known acid acceptors such as triethylamine. A preferred preparative method consists of heating the free aromatic dicarboxylic acids in the presence of monocarboxylic acid ester of the aromatic diol (e.g., the diacetate of the alcohol) as illustrated by U.S. Pat. No. 3,317,464 herein incorporated by reference.

Other methods of preparing the aromatic polyester are illustrated in U.S. Pat. Nos. 3,220,971; 3,036,990; and 3,216,970 which are all herein incorporated by reference.

The wholly aromatic polyester forming polymerization reaction is conducted to achieve an inherent viscosity based on a 0.1 percent solution of the polymer at 25° C. in suitable solvent such as tetrachloroethane as hereinafter described, of at least about 0.4, and preferably from about 0.6 to about 1.2 to achieve a polymer having the desired n values as outlined above. As is known in the polymer art, inherent viscosity is monotonically related to the molecular weight of the polymer.

DESCRIPTION OF PHOSPHORUS ESTER AND PREPARATION THEREOF

The phosphorus ester which is blended with the normally non-melt processable aromatic polyester described herein is summarized by recurring structural formula:

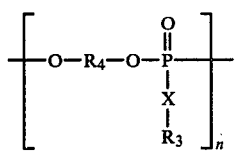

IV.

wherein n is at least 3, x can be the same or different and represent single bond, oxy or sulfide. Thus, when X is a single bond in the recurring structural formula the phosphorus ester is a polyphosphonate; when X is oxy and the phosphorus ester is a polyphosphate; and when X is sulfide the phosphorus ester is a polythiophosphate. $R_3$ can be the same or different and represent lower alkyl, aryl, haloaryl, haloalkyl and mixtures thereof, $R_4$ can be the same or different and represent arylene, alkylene, haloarylene and mixtures thereof. Halogen is defined herein to consist of chlorine and bromine.

Representative examples of suitable aryl and haloaryl substituents of $R_3$ include phenyl, methyl phenyl, 2,6 dimethyl phenyl, 2,4,6-trimethyl phenyl, bi-phenyl, 2,3,5-trichlorophenyl, 4-bromophenyl, 2,4,5-tribromophenyl, naphthyl, and the like.

Representative examples of suitable alkyl and haloalkyl substituents of $R_3$ include lower alkyl and halogenated alkyl groups of from about 1 to about 10 carbon atoms such as methyl, ethyl, propyl, isopropyl, butyl, isobutyl, octyl, iso-octyl, 2-ethylhexyl, 3-methyl butyl chloromethyl, chloroethyl, and 2,3-dibromopropyl.

Preferred examples of suitable $R_3$ substituents include phenyl and chloromethyl (i.e., $CH_2Cl$) when X is single bond or sulfide and phenyl, octyl, and 2-ethylhexyl when X is oxy.

Representative examples of suitable arylene and haloarylene substituents within the scope of $R_4$ include phenylene, biphenylene, naphthylene, bis(4-phenylene)-sulfone, bis(4-diphenylene)ether, bis(4-phenylene)sulfide, 2,2-bis(4-phenylene) propane and its halogenated derivatives; 2,5-dichloro-1, 4-phenylene, 2,5-dibromo-1,4-phenylene, 2,2'-dichloro-4,4'-biphenylene; 3,3'-dibromo-4,4'-biphenylene, 4,8-dichloro-2, 6-naphthylene, and 3,7-dibromo-2, 6-naphthylene.

Representative examples of suitable alkylene substituents within the scope of $R_4$ include ethylene, propylene, butylene, isopropylene, and isobutylene.

Preferred substituents of $R_4$ include p-phenylene; m-phenylene, 4,4'-diphenylene sulfone; and 4,4'-diphenylene-2, 2-propane.

The length of the phosphorus ester polymer chain as indicated by n depends on the identity of X.

Thus, where X is oxy n can vary from about 3 to not greater than about 15 due to problems of formulation which ensue at n values greater than about 15. Where X is single bond or sulfide n can vary from about 10 to about 100, preferably from about 15 to 50 (e.g., 20). When the identity of X is a combination of all three possible radicals, i.e., oxy, sulfide, and single bond n will generally vary from about 3 to about 20.

The phosphorus esters described above exhibit a variety of end groups depending on the synthesis route selected and the identity of X. Thus, the end group can be illustrated by $Y_1$ and $Y_2$ in the following structural formula:

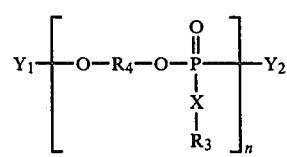

V.

wherein X, $R_3$ and $R_4$ and n are as described above.

When X is oxy $Y_1$ can represent the substituent

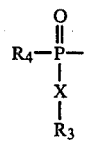

wherein X, $R_3$ and $R_4$ and n are as described above. Alternatively, when X is single bond or sulfide $Y_1$ can be the same or different and represent hydroxyl or the radical:

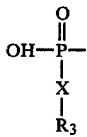

wherein X and $R_3$ are as described above.

Similarly, when X is oxy $Y_2$ can represent phenyl, and when X is single bond or sulfide $Y_2$ can be the same or different and represent hydroxyl or $R_4$-OH wherein $R_4$ is as described above.

The phosphorus esters of the present invention may be prepared by a variety of methods. One method illustrated in U.S. Pat. No. 3,761,543 herein incorporated by reference, is directed to a two step process in a manner generically shown by Kosolapoff, *Organophosphorus Compounds*, John Wiley and Sons, Inc. (1950). In the first step, a phosphorus oxyhalide is reacted in the presence of a tertiary nitrogen base with an essentially equal molar amount of the monohydric alcohol or phenol. In the second step of the reaction, the product of the first step of the reaction is reacted with an essentially equal molar amount of a dihydroxy compound such as resorcinol, hydroquinone, 4,4'-biphenyldiol, bis (4-hydroxy phenyl) sulfone, and 2,2-bis(4-hydroxyphenyl)propane, until the desired molecular weight is obtained. Halogenated compounds may be prepared by using halogenated reactants such as a halogenated bisphenol in the two-step reaction above or by using at least partially unhalogenated hydroxylated reactants in the reaction above and then halogenating the final product with a suitable halogenating agent.

The phosphorus ester forming polymerization reaction is conducted to achieve an inherent viscosity (I.V.) of at least about 0.01, and preferably from about 0.02 to 0.1, where X in the recurring structural formula is oxy and at least about 0.05, and preferably from about 0.1 to 0.8, wherein X of the recurring structural formula is single bond or sulfide. The I.V. is determined by measurement of the relative viscosity of a 0.1 percent solution of the polymer at 25° C. in a suitable solvent, such as methylene chloride. The viscosity of the polymer solution is measured relative to the viscosity of the solvent alone and the inherent viscosity is determined from the following equation:

$$I.V. = \frac{\ln \frac{V_2}{V_1}}{C}$$

In the above formula, $V_2$ is the efflux time of the solution, $V_1$ is the efflux time of the solvent, and C is the concentration expressed in grams of polymer per 100 ml. of solution. As is known in the polymer art, inherent viscosity is monotonically related to the molecular weight of the polymer.

The specific amount of the phosphorus ester selected for admixing with the wholly aromatic polyester is generally cotingent on the extent to which the melting point of the wholly aromatic polyester is sought to be lowered.

Thus, a number of blends of the wholly aromatic polyester and phosphorus ester can be prepared with the concentration of the phosphorus ester therein being varied within the above described limits. The melting characteristics of each blend is then determined. The amount of phosphorus ester in the blend required to yield the desired melt characteristics is then chosen based on this data.

Accordingly, the wholly aromatic polyester of the recurring structural formula is present in the composition in amounts which can vary from about 95 to about 60 percent by weight, preferably from about 90 to about 75 percent by weight and most preferably from about 85 to about 80 percent by weight of the composition (i.e., the combined weight of the polyester and the phosphorus ester). Correspondingly, the phosphorus ester of the recurring structural formula is present in the composition in amounts which can vary from about 5 to about 40 percent by weight, preferably from about 10 to about 25 percent by weight, and most preferably from about 15 to about 20 percent by weight (e.g., 20 percent) of the composition (i.e., the combined weight of the polyester and phosphorus ester). Amounts of the phosphorus ester in excess of 40 percent by weight will generally adversely affect the physical properties of the composition.

The composition of the present invention, unlike the wholly aromatic polyesters present therein, can be melt processed at temperatures which can vary from about 200° to about 350° C., preferably from about 225° to about 325° C., and most preferably from about 250° to about 310° C. and at corresponding pressures which can vary from about 30 to about 40,000 psi, preferably from about 60 to about 35,000 psi and most preferably from about 90 to about 30,000 psi, respectively.

The actual blending of the phosphorus ester additives with the normally non-melt processable wholly aromatic polyester described herein may be accomplished by means of any convenient procedure which will result in an intimate admixture of the additive within the mass of the wholly aromatic polyester polymer. Thus, for example, a solution of the phosphorus ester additive may simply be blended or otherwise admixed with the substrate polymer. Or, if so desired, the phosphorus ester additive can, if each is in the form of a solid powder, be admixed and thereafter formed into the desired product.

In another alternative, the phosphorus ester additives, which may be in the form of a viscous liquid or a solid ground to a suitable particle size depending on the composition, may be mixed with the wholly aromatic polyester which is ground to a suitable particle size, and coextruded, or the additives and said synthetic polyesters may both be dissolved, the solutions combined and formed into shaped structures by wet or dry spinning.

The temperature at which the phosphorus ester additive and wholly aromatic polyester are blended may vary depending on the particular method of blending utilized, as would be obvious to one skilled in the art, provided the temperature does not exceed the point at which the components of the composition begin to degrade. Where melt blending is employed, the temperature utilized must be above the melting point of the blend and below the thermal degradation point of the components of the blend. Thus, blending temperatures for polyesters generally should not exceed 400° C.

When forming fibers and films the extrusion orifice may be selected from among those commonly utilized during the melt extrusion of such shaped articles. For instance, the shaped extrusion orifice may be in the form of a rectangular slit when forming a polymeric film. When forming a filamentary material the spinneret selected may contain one and preferably a plurality of extrusion orifices. For instance, a standard conical spinneret containing 1 to 200 holes (e.g., 6 to 200 holes), such as commonly used in the melt spinning of polyethylene terephthalate, having a diameter of about 5 to 60 mils (e.g., 10 to 40 mils) may be utilized. Yarns of about 20 to 36 continuous filaments are commonly formed. The meltspinnable wholly aromatic polyester-phosphorus ester containing composition is supplied to the extrusion orifice at a temperature above its melting point, e.g., a temperature of about 250° to 350° C. (e.g., 290° C.).

Subsequent to extrusion through the shaped orifice the resulting filamentary material or film is passed in the direction of its length through a solidification or quench zone wherein the molten filamentary material or film is transformed to a solid filamentary material or film. The resulting fibers commonly have a denier per filament of about 2 to 50, and preferably a denier per filament of about 2 to 20.

As-spun fibers formed from the wholly aromatic polyester containing composition of the present invention commonly exhibit an average single filament tenacity of at least about 0.5 grams per denier (e.g., about 1 to 20 grams per denier), an average single filament tensile modulus of at least about 5 grams per denier (e.g., about 10 to 500 grams per denier).

In addition to imparting melt processability to certain normally non-melt processable wholly aromatic polyesters, the phosphorus ester additive dissolved therein enhances the flame retardant properties including a decreased smoke generation.

The compositions of this invention may be prepared so as to contain various optional additives as would be obvious to one skilled in the art which may include plasticizers such as the alkyl esters of phthalic, adipic and sebacic acids such, for example, as dioctyl phthalate and ditridecyl phthalate and aryl phosphate esters, such as, diphenyl and tricresyl phosphate, etc.; lubricants and mold release agents such as stearic acid or its metal salts, petroleum based waxes, mineral oils, polyethylene waxes, etc.; and heat and light stabilizers, such as, barium, cadmium, calcium, zinc soaps or phenates, basic lead compounds, organo-tin compounds, such as dialkyl tin mercaptides and dialkyl tin maleates, thiolauric anhydride and n-butyl stannoic acid, epoxidized oils, alkyl diphenyl phosphites, triaryl phosphites, phenyl salicylates, benzophenones and benzotriazoles, etc. For a more complete listing of plasticizers, lubricants, stabilizers and other functional additives, one may consult "Polyvinyl Chloride" by H. A. Sarvetnick published by Van Nostrand Reinhold Co., New York, N.Y., in 1969.

These polymer compositions may also contain fillers, pigments, dyes, opacifying agents, antistatic agents, decorative additives such as reflective metal foils or flakes, and other imbedded solid objects such as fiber glass, textile fibers, asbestos, paper, and the like, provided that they do not adversely influence the properties of the resulting end products. In addition, the compositions may contain other flame retardants such as antimony compounds, halogenated alkyl phosphates or phosphonates, alkyl acid phosphates, or small concentrations of phosphoric acid.

The invention is additionally illustrated in connection with the following Examples, which are to be considered as illustrative of the present invention. It should be understood, however, that the invention is not limited to the specific details of the Examples.

The invention is additionally illustrated in connection with the following Examples, which are to be considered as illustrative of the present invention. All parts and percentages throughout the specification and claims are by weight unless specified otherwise. It should be understood, however, that the invention is not limited to the specific details of the Examples.

EXAMPLE 1

27.53 gm. (0.25) mole) of resorcinol and 29.58 gm. (0.25 mole) phenophthalein are added to a reaction vessel equipped with reflux condenser and stirrer and containing 400 ml. of methylene chloride. 115 gm. of triethylamine in 300 ml. of methylene chloride is then added to the reaction vessel. A second solution containing 103 gm. of a mixture of isophthaloyl chloride and terephthaloyl chloride wherein the components of said mixture are present therein at a molar ratio of about 0.6:0.4, respectively, dissolved in 150 ml. of methylene chloride is added to the reaction vessel containing the dihydric alcohols over a period of about 1.5 hours. Additional methylene chloride solvent may be added to ensure adequate stirring.

Upon completion of the addition of the diacid chloride solution the contents of the reaction vessel are stirred for an additional 0.5 hours. The resulting polymer containing solution is washed two times with 200 ml. of a 2 percent solution of HCl and five times with 200 ml. of water.

The resulting wholly aromatic polyester has an inherent viscosity of about 0.8 in tetrachloroethane and a weight average molecule weight of about 30,000 which corresponds to an n value of about 50.

To prepare the composition 40 gm. of poly (m-phenylene) phenyl phosphate are then dissolved in the washed polymer containing solution.

The wholly aromatic polyester and the above-described are then co-precipitated with methanol and dried.

The resulting composition is then redissolved in methylene chloride and cast into a film and the appearance and color of the resulting film are observed.

The composition is also extruded in a conventional melt-index apparatus (i.e., THERMODYNE TM manufactured by Timius Olesin Co., Willow Grove, Pennsylvania) at a temperature of about 290° C. to form a strand and the appearance thereof is noted.

The results of this example are summarized in Table I.

EXAMPLES 2-4

Example 1 is repeated except that the wholly aromatic polyester is prepared by reacting 55 gms. of resorcinol with 102 gms. of the diacid chloride mixture described in Example 1. The resulting wholly aromatic polyester has an inherent viscosity of about 0.9 in tetrachloroethane and a weight average molecular weight of about 1500 which corresponds to an an value of about 60. The amount of the polyphosphate incorporated therein is also varied.

The results of Examples 2 to 4 are also summarized in Table I.

COMPARATIVE EXAMPLES 1 AND 2

To illustrate the effect of a phosphorus ester on melt-processability Examples 1 and 2 are repeated except that the respective wholly aromatic polyester utilized therein is not blended with a phosphorus ester. The results of Comparative Examples 1 and 2 are also summarized at Table I.

As may be seen from a review of Table I the presence of the phosphorus ester described herein renders the wholly aromatic polyester utilized melt processable.

dures outlined in Example 1. The resulting composition after washing is then injection molded under the following conditions:
cylinder temperature 275° C.
mold temperature 80° C.
cycle time (cycle times/sec.)
injection 10
cooling 20
delay 2
injection pressure (psi) 17,000

The resulting extruded parts are observed to be smooth and flexible, which is indicative of good melt processability.

COMPARATIVE EXAMPLE 3

TABLE I

| Example | Wholly Aromatic Polyester | Phosphorus Ester | Concentration of Phosphorus Ester in Blend (% by weight) | Appearance and Color of Film | Extrusion Temperature and Appearance of Strand |
|---|---|---|---|---|---|
| 1 | A | C | 20 | Clear, colorless | 290° C. - smooth, tan colored |
| 2 | B | C | 20 | Clear, slightly yellow | 290° C. - brown, smooth strand |
| 3 | B | C | 10 | Clear, colorless | 290° C. - brown, smooth strand |
| 4 | B | C | 20 | Clear, slightly yellow | 290° C. - smooth, brown brittle strand |
| Comparative Examples | | | | | |
| 1 | A | None | — | Clear, slightly yellow | 300° C. 1 would not extrude |
| 2 | B | None | — | Clear, colorless | 290° C. - only partial extrusion possible before extensive cross-linking renders extrusion impossible |

A = wholly aromatic polyester of the recurring structural formula wherein Ar₁ is derived from an equimolar mixture of resorcinol and 3,3-bis(p-hydroxyphenyl) phthalide and Ar₅ is a mixture of m-phenylene, and p-phenylene wherein the components of said mixture are present therein at a molar ratio of about .6:.4, respectively, and n is about 50.

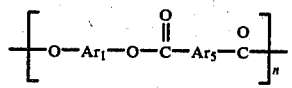

B = wholly aromatic polyester of the recurring structural formula illustrated for Example 1 wherein Ar₁ is m-phenylene, Ar₅ is as described for polyester A and n is about 60.
C = phosphorus ester of the recurring structural formula wherein X is oxy, R₄ is m-phenylene, R₃ is phenyl and n is about 8.

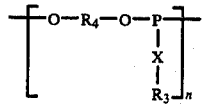

EXAMPLES 5 and 6

The compositions utilized in accordance with Examples 1 and 2 are injection molded, utilizing a cylinder temperature of about 280° C., a mold temperature of about 80° C., cycle time in cycle times/sec. of injection 10, cooling 20 and relay 2 and an injection pressure of about 15,000 psi.

The resulting molded articles for each sample are tan to brown, generally strong, flexible and have a good smooth surface.

EXAMPLE 7

159 gms. of 3,3-bis(p-hydroxy phenyl) phthalide is reacted by the solution polymerization technique with 102 gms. of a 0.6:0.4 molar ratio mixture of isophthaloyl chloride and terephthaloyl chloride, respectively, and blended with about 45 gms., (i.e., 20 percent by weight of the total blend) of the poly(m-phenylene) phenyl phosphate of Example 1 in accordance with the proce- The same phenolphthalein polyester utilized in accordance with Example 7 is attempted to be injection molded at a temperature of about 350° C. and a pressure of about 20,000 psi. in the absence of the phosphorus ester. The phenolphthalein polyester will not extrude even at temperatures as high as 350° C.

Although the invention has been described with preferred embodiments, it is to be understood that variations and modifications may be resorted to as will be apparent to those skilled in the art. Such variations and modifications are to be considered within the preview and the scope of the claims appended hereto.

What is claimed is:

1. An improved melt processable wholly aromatic polyester composition which comprises in intimate admixture:

I. from about 95 to about 60 percent by weight of said composition of a normally non-melt processable wholly aromatic polyester having a recurring structural formula:

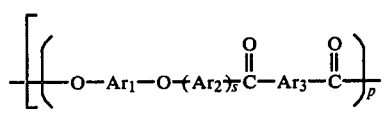

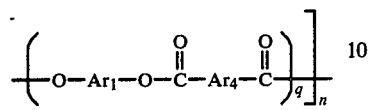

wherein n is an integer of at least 10, Ar₁ is a divalent alcohol derived moiety selected from the group consisting of (a)

(b)

(c)

(d)

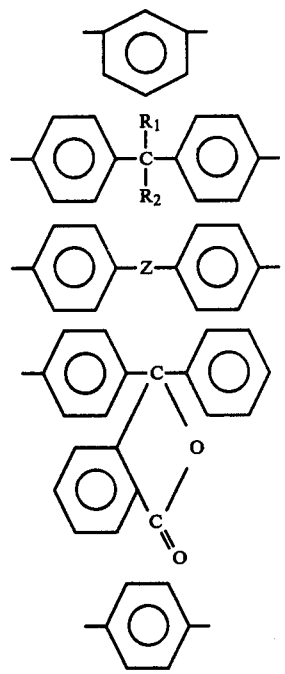

(e)

and mixtures thereof,
wherein $R_1$ and $R_2$ which may be the same or different represent hydrogen, a lower alkyl group or together constitute a cyclic hydrocarbon group and Z is selected from the group consisting of sulfide, sulfone, oxy and carbonyl;
Ar₂ is the p-hydroxy benzoic acid derived moiety

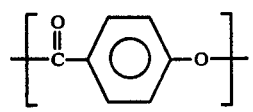

which when present is accompanied by substantially equimolar amounts of the divalent moiety Ar₁ and the acid derived moiety as represented by Ar₃ and Ar₄ collectively;
Ar₃ consists essentially of an aromatic dicarboxylic acid-derived moiety selected from the group consisting of m-phenylene, p-phenylene and naphthylene and mixtures thereof;
Ar₄ is p-phenylene; and wherein s is 0 or 1, p is at least 1, q is zero when Ar₃ is other than naphthylene and q is at least 1 when Ar₃ is naphthylene with the ratio of p and q being sufficient to yield a normally non-melt processable wholly aromatic polyester;
and (II) from about 5 to about 40 percent by weight of the total composition of a phosphorus ester having the recurring structural formula:

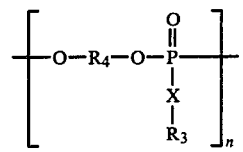

wherein n is at least 3, X can be the same or different and represent a single bond, oxy and sulfide, $R_3$ can be the same or different and represent lower alkyl, aryl, haloaryl, halo alkyl, and mixtures thereof; $R_4$ can be the same or different and represent arylene, alkylene and haloarylene and mixtures thereof.

2. The composition of claim 1 wherein in the phosphorus ester of the recurring structural formula $R_3$ in phenyl, X is oxy and $R_4$ is selected from the group consisting of p-phenylene, m-phenylene and mixtures thereof.

3. The composition of claim 1 wherein in the phosphorus ester of the recurring structural formula X is single bond, $R_3$ is chloromethyl and $R_4$ is selected from the group consisting of p-phenylene, m-phenylene and mixtures thereof.

4. The composition of claim 1 wherein in the phosphorus ester of the recurring structural formula X is oxy and n can vary from about 3 to about 15.

5. The composition of claim 1 wherein in the phosphorus ester of the recurring structural formula X is selected from the group consisting of single bond and sulfide and mixtures thereof and n can vary from about 10 to about 100.

6. The composition of claim 1 wherein the phosphorus ester is present therein in an amount of about 10 to about 25 percent by weight of the composition.

7. A melt processable wholly aromatic polyester composition which comprises in intimate admixture;
(I) from about 95 to about 60 percent by weight of said composition of a normally non-melt processable wholly aromatic polyester of the recurring structural formula:

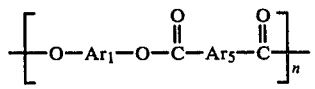

wherein n is an integer of at least 10, Ar₁ is a divalent moiety selected from the group consisting of (a)

(b)

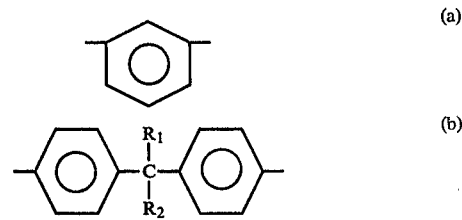

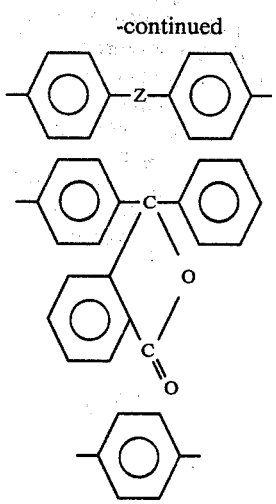

wherein $R_5$ and $R_6$ which may be the same or different represent hydrogen, a lower alkyl group or together constitute a cyclic hydrocarbon group, and Z is selected from the group consisting of sulfide, sulfone, oxy, and carbonyl;

and wherein $Ar_5$ is a phthalic acid derived moiety selected from the group consisting of m-phenylene, p-phenylene and mixtures thereof in which the phthalic acid derived moiety is present in said polyester at an isomer ratio sufficient to yield a normally non-melt processable polyester;

and (II) from about 5 to about 40 percent by weight of the total composition of a phosphorus ester of the recurring structural formula:

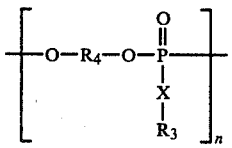

wherein n is an integer of at least 3, X can be the same or different and represent a single bond, oxy, and sulfide, $R_3$ can be the same or different and represent a radical selected from the group consisting of lower alkyl, aryl, haloalkyl, haloaryl, and mixtures thereof, $R_4$ can be the same or different and represent a radical selected from the group consisting of arylene, alkylene, halo arylene and mixtures thereof.

8. The composition of claim 7 wherein $Ar_1$ of the polyester of the recurring structural formula is m-phenylene illustrated by formula (a) and the phthalic acid derived moiety illustrated $Ar_5$ constitutes from about 95 to about 75 mole percent p-phenylene and correspondingly from about 5 to about 25 mole percent m-phenylene.

9. The composition of claim 7 wherein $Ar_1$ of the polyester of the recurring structural formula is the alkylidene bis-phenylene illustrated by formula (b) and the phthalic acid derived moiety illustrated by $Ar_5$ constitutes from about 75 to about 50 mole percent p-phenylene and correspondingly from about 25 to about 50 mole percent m-phenylene.

10. The composition of claim 7 wherein $Ar_1$ of the polyester of the recurring structural formula is illustrated by the bis-phenylene of formula (c) wherein Z is oxy and the phthalic acid derived moiety illustrated by $Ar_5$ is from about 95 to about 65 mole percent p-phenylene and correspondingly about 5 to about 35 mole percent m-phenylene.

11. The composition of claim 7 wherein $Ar_1$ of the polyester of the recurring structural formula is the bis-phenylene illustrated by formula (c) wherein Z is sulfide and the phthalic acid derived moiety illustrated by $Ar_5$ constitutes from about 95 to about 60 mole percent p-phenylene and correspondingly about 5 to about 40 mole percent m-phenylene.

12. The composition of claim 7 wherein $Ar_1$ of the polyester of the recurring structural formula is the bis-phenylene illustrated by formula (c) wherein Z is sulfone and the phthalic acid derived moiety illustrated by $Ar_5$ constitutes from about 95 to about 55 mole percent p-phenylene and correspondingly from about 5 to about 45 mole percent m-phenylene.

13. The composition of claim 7 wherein $Ar_1$ of the polyester of the recurring structural formula is the bis-phenylene illustrated by formula (c) wherein Z is carbonyl and the phthalic acid derived moiety illustrated by $Ar_5$ constitutes from about 95 to about 50 mole percent p-phenylene and correspondingly from about 5 to about 50 mole percent m-phenylene.

14. The composition of claim 7 wherein $Ar_1$ of the polyester of the recurring structural formula is the bis-(p-phenylene) phthalide illustrated by formula (d) and the phthalic acid derived moiety illustrated by $Ar_5$ constitutes from about 90 to about 50 mole percent p-phenylene and correspondingly from about 10 to about 50 mole percent m-phenylene.

15. The composition of claim 7 wherein $Ar_1$ of the polyester of the recurring structural formula is p-phenylene and the phthalic acid derived moiety illustrated by $Ar_5$ constitutes from about 85 to about 50 mole percent p-phenylene and correspondingly from about 15 to about 50 mole percent m-phenylene.

16. The composition of claim 7 wherein in the phosphorus ester of the recurring structural formula $R_3$ is phenyl, X is oxy and $R_4$ is selected from the group consisting of p-phenylene, m-phenylene and mixtures thereof.

17. The composition of claim 7 wherein in the phosphorus ester of the recurring structural formula X is a single bond, $R_3$ is chloromethyl and $R_4$ is selected from the group consisting of p-phenylene, m-phenylene and mixtures thereof.

18. The composition of claim 7 wherein in the phosphorus ester of the recurring structural formula X is oxy and n can vary from about 3 to about 15.

19. The composition of claim 7 wherein in the phosphorus ester of the recurring structural formula X is selected from the group consisting of single bond, sulfide, and mixtures thereof, and n can vary from about 10 to about 100.

20. The composition of claim 7 wherein the phosphorus ester is present therein in an amount which can vary from about 10 to about 25 percent by weight of the composition.

21. A melt processable wholly aromatic polyester composition which comprises in intimate admixture:
(I) from about 95 to about 60 percent by weight of the composition of a normally non-melt processable wholly aromatic polyester of the recurring structural formula:

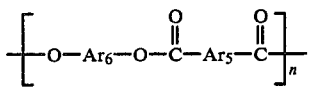

wherein n is at least 10, Ar₆ is a mixture of the divalent moieties comprising:

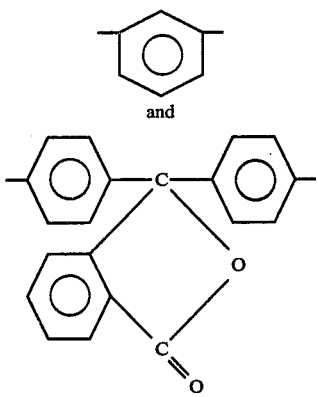

and Ar₅ is a phthalic acid derived moiety selected from the group consisting of m-phenylene, p-phenylene and mixtures thereof; and (II) from about 5 to about 40 percent by weight of the total composition of a phosphorus ester of the recurring structural formula

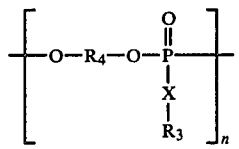

wherein n is at least 3, X can be the same or different and represent a single bond, oxy and sulfide, R₃ can be the same or different and represent lower alkyl, aryl, haloaryl, haloalkyl, and mixtures thereof; R₄ can be the same of different and represent arylene, alkylene and haloarylene and mixtures thereof.

22. The composition of claim 21 wherein in the phosphorus ester of the recurring structural formula R₃ is phenyl, X is oxy and R₄ is selected from the group consisting of p-phenylene, m-phenylene and mixtures thereof.

23. The composition of claim 21 wherein in the phosphorus ester of the recurring structural formula X is a single bond, R₃ is chloromethyl and R₄ is selected from the group consisting of p-phenylene, m-phenylene and mixtures thereof.

24. The composition of claim 21 wherein in the phosphorus ester of the recurring structural formula X is oxy and n can vary from about 3 to about 15.

25. The composition of claim 21 wherein in the phosphorus ester of the recurring structural formula X is selected from the group consisting of single bond, sulfide and mixtures thereof and n can vary from about 10 to about 100.

26. The composition of claim 21 wherein the phosphorus ester is present therein in an amount of about 10 to about 25 percent by weight of the composition.

27. The composition of claim 21 wherein the component moieties constituting Ar₆ are present within said polyester at a molar ratio of about 1:1 and wherein Ar₅ constitutes from about 60 mole percent p-phenylene and correspondingly about 40 mole percent m-phenylene.

28. A process for providing a melt processable wholly aromatic polyester composition which comprises blending in intimate admixture:

(I) from about 95 to about 60 percent by weight of said composition of a normally non-melt processable wholly aromatic polyester of the recurring structural formula:

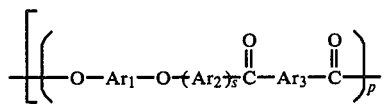

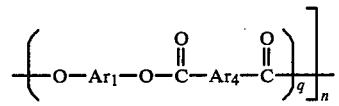

wherein n is an integer of at least 10, Ar₁ is a divalent moiety selected from the group consisting of

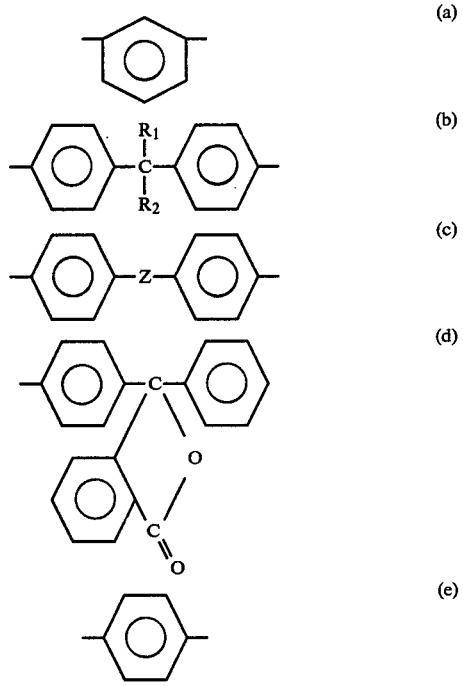

and mixtures thereof
wherein R₁ and R₂ which may be the same or different represent hydrogen, a lower alkyl group or together constitute a cyclic hydrocarbon group and Z is selected from the group consisting of sulfide, sulfone, oxy and carbonyl;

Ar₂ is the p-hydroxy benzoic acid derived moiety

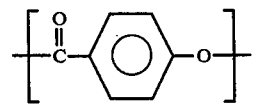

which when present is accompanied by substantially equimolar amounts of the divalent moiety Ar₁ and the acid derived moiety as represented by Ar₃ and Ar₄ collectively;

Ar₃ consists essentially of an aromatic dicarboxylic acid-derived moiety selected from the group consisting of m-phenylene, p-phenylene and naphthylene and mixtures thereof;

Ar₄ is p-phenylene; and wherein s is 0 or 1, p is at least 1, q is zero when Ar₃ is other than naphthylene and q is at least 1 when Ar₃ is naphthylene with the ratio of p and q being sufficient to yeild a normally non-melt processable wholly aromatic polyester;

with (II) from about 5 to about 40 percent by weight of the total composition of a phosphorus ester having the recurring structural formula:

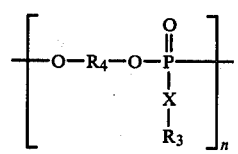

wherein n is at least 3, X can be the same or different and represent a single bond, oxy and sulfide, $R_3$ can be the same or different, and represent lower alkyl, aryl, haloaryl, haloalkyl, and mixtures thereof; $R_4$ can be the same or different and represent arylene, alkylene and haloarylene and mixtures thereof to yield a composition which is melt processable at a temperature of from about 200° to about 350° C. and at a pressure of from about 30 to about 40,000 psi.

29. The process of claim 28 wherein in the phosphorus ester of the recurring structural formula $R_3$ is phenyl, X is oxy and $R_4$ is selected from the group consisting of p-phenylene, m-phenylene and mixtures thereof.

30. The process of claim 28 wherein in the phosphorus ester of the recurring structural formula X is a single bond, $R_3$ is chloromethyl and $R_4$ is selected from the group consisting of p-phenylene, m-phenylene and mixtures thereof.

31. The process of claim 28 wherein in the phosphorus ester of the recurring structural formula X is oxy and n can vary from about 3 to about 15.

32. The process of claim 28 wherein in the phosphorus ester of the recurring structural formula X is selected from the group consisting of single bond, sulfide and mixtures thereof and n can vary from about 10 to about 100.

33. The process of claim 28 wherein the phosphorus ester is blended with said wholly aromatic polyester in an amount of about 10 to about 25 percent by weight of the composition.

34. The process of claim 28 wherein the resulting composition is capable of being melt processed at a temperature of from about 225° to about 325° C. and at a pressure of about 60 to about 35,000 psi.

35. A process for providing a melt processable wholly aromatic polyester containing composition which comprises blending in intimate admixture:

I. from about 95 to about 60 percent by weight of said composition of a normally non-melt processable wholly aromatic polyester of the recurring structural formula:

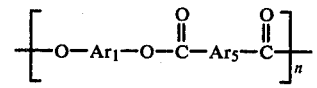

wherein n is an integer of at least 10, Ar₁ is a divalent moiety selected from the group consisting of

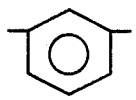
(a)

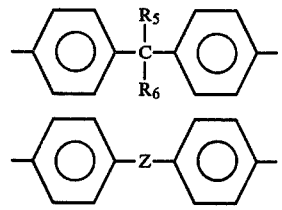
(b)

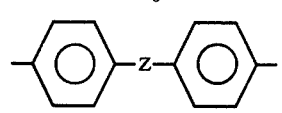
(c)

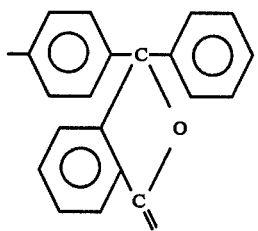
and
(d)

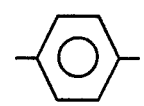
(e)

wherein $R_5$ and $R_6$ which may be the same or different represent hydrogen, a lower alkyl group or together constitute a cyclic hydrocarbon group, and Z is selected from the group consisting of sulfide, sulfone, oxy, and carbonyl;

and wherein Ar₅ is a phthalic acid derived moiety selected from the group consisting of m-phenylene, p-phenylene and mixtures thereof in which the phthalic acid derived moiety is present in said polyester at an isomer ratio sufficient to yield a non-melt processable polyester; with II. from about 5 to about 40 percent by weight of the total composition of a phosphorus ester of the recurring structural formula

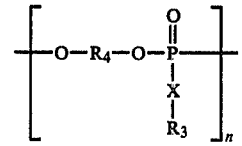

wherein n is an integer of at least 3, X can be the same or different and represent a single bond, oxy, and sulfide, $R_3$ can be the same or different and represent a radical selected from the group consisting of lower alkyl, aryl, haloalkyl, haloaryl, and mixtures thereof, $R_4$ can be the same or different and represent a radical selected from the group consisting of arylene, alkylene, haloarylene and mixtures thereof to yield a composition which is melt processable at a temperature of from about 200° to about 350° C. and at a pressure of from about 30 to about 40,000 psi.

36. The process of claim 35 wherein $Ar_1$ of the polyester of the recurring structural formula is m-phenylene illustrated by formula (a) and the phthalic acid derived moiety illustrated by $Ar_5$ constitutes from about 95 to about 75 mole percent p-phenylene and correspondingly from about 5 to about 25 mole percent m-phenylene.

37. The process of claim 35 wherein $Ar_1$ of the polyester of the recurring structural formula is the alkylidene bis-phenylene illustrated by formula (b) and the phthalic acid derived moiety illustrated by $Ar_5$ constitutes from about 75 to about 50 mole percent p-phenylene and correspondingly from about 25 to about 50 mole percent m-phenylene.

38. The process of claim 35 wherein $Ar_1$ of the polyester of the recurring structural formula is illustrated by the bis-phenylene of formula (c) wherein Z is oxy and the phthalic acid derived moeity illustrated by $Ar_5$ is from about 95 to about 65 mole percent p-phenylene and correspondingly about 5 to about 35 mole percent m-phenylene.

39. The process of claim 35 wherein $Ar_1$ of the polyester of the recurring structural formula is the bis-phenylene illustrated by formula (c) wherein Z is sulfide and the phthalic acid derived moiety illustrated by $Ar_5$ constitutes from about 95 to about 65 mole percent p-phenylene and correspondingly about 5 to about 35 mole percent m-phenylene.

40. The process of claim 35 wherein $Ar_1$ of the polyester of the recurring structural formula is the bis-phenylene illustrated by formula (c) wherein Z is sulfone and the phthalic acid derived moiety illustrated by $Ar_5$ constitutes from about 95 to about 55 mole percent p-phenylene and correspondingly from about 5 to about 45 mole percent m-phenylene.

41. The process of claim 35 wherein $Ar_1$ of the polyester of the recurring structural formula is the bis-phenylene illustrated by formula (c) wherein Z is carbonyl and the phthalic acid derived moiety illustrated by $Ar_5$ constitutes from about 95 to about 50 mole percent p-phenylene and correspondingly from about 5 to about 50 mole percent m-phenylene.

42. The process of claim 35 wherein $Ar_1$ of the polyester of the recurring structural formula is the bis-(p-phenylene) phthalide illustrated by formula (d) and the phthalic acid derived moiety illustrated by $Ar_5$ constitutes from about 90 to about 50 mole percent p-phenylene and correspondingly from about 10 to about 50 mole percent m-phenylene.

43. The process of claim 35 wherein $Ar_1$ of the recurring structural formula is p-phenylene and the phthalic acid derived moeity illustrated by $Ar_5$ constitutes from about 85 to about 50 mole percent p-phenylene and correspondingly from about 15 to about 50 mole percent m-phenylene.

44. The process of claim 35 wherein in the phosphorus ester of the recurring structural formula $R_3$ is phenyl, X is oxy and $R_4$ is selected from the group consisting of p-phenylene, m-phenylene and mixtures thereof.

45. The process of claim 35 wherein in the phosphorus ester of the recurring structural formula X is a single bond, $R_3$ is chloromethyl and $R_4$ is selected from the group consisting of p-phenylene, m-phenylene and mixtures thereof.

46. The process of claim 35 wherein in the phosphorus ester of the recurring structural formula X is oxy and n can vary from about 3 to about 15.

47. The process of claim 35 wherein the phosphorus ester of the recurring structural formula X is selected from the group consisting of single bond, sulfide, and mixtures thereof and can vary from about 10 to about 100.

48. The process of claim 35 wherein the phosphorus ester is present therein in an amount which can vary from about 10 to about 25 percent by weight of the composition.

49. A process for preparing a melt processable wholly aromatic polyester containing composition which comprises blending in intimate admixture:
   I. from about 95 to about 60 percent by weight of a normally non-melt processable wholly aromatic polyester of the recurring structural formula:

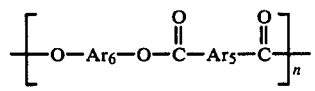

wherein n is at least 10, $Ar_6$ is a mixture of the divalent moieties comprising:

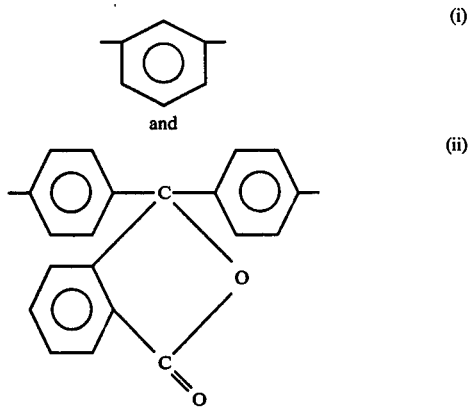

and $Ar_5$ is a phthalic acid derived moiety selected from the group consisting of m-phenylene, p-phenylene and mixtures thereof; with
   II. from about 5 to about 40 percent by weight of the total composition of a phosphorus ester of the recurring structural formula:

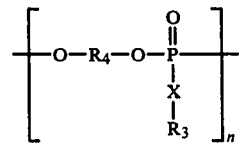

wherein n is at least 3, X can be the same or different and represent a single bond, oxy and sulfide, $R_3$ can be the same or different and represent lower alkyl, aryl, haloaryl, haloalkyl, and mixtures thereof; $R_4$ can be the same or different and represent arylene, alkylene and haloarylene and mixtures thereof to yield a composition which is melt processable at a temperature of from about 200° to about 350° C. and at a pressure of from about 30 to about 40,000 psi.

50. The process of claim 49 wherein in the phosphorus ester of the recurring structural formula $R_3$ is phenyl, X is oxy and $R_4$ is selected from the group consisting of p-phenylene, m-phenylene and mixtures thereof.

51. The process of claim 49 wherein in the phosphorus ester of the recurring structural formula X is a single bond, $R_3$ is chloromethyl and $R_4$ is selected from the group consisting of p-phenylene, m-phenylene and mixtures thereof.

52. The process of claim 49 wherein in the phosphorus ester of the recurring structural formula X is oxy and n can vary from about 3 to about 15.

53. The process of claim 49 wherein in the phosphorus ester of the recurring structural formula X is selected from the group consisting of single bond, sulfide and mixtures thereof and n can vary from about 10 to about 100.

54. The process of claim 49 wherein the phosphorus ester is blended with said wholly aromatic polyester in an amount of about 10 to about 25 percent by weight of the composition.

* * * * *